(12) United States Patent
Ogino et al.

(10) Patent No.: US 6,211,301 B1
(45) Date of Patent: Apr. 3, 2001

(54) METHOD FOR PRODUCTION OF ANTIFOULING RESIN AND ANTIFOULING RESIN COMPOSITION

(75) Inventors: Shinichi Ogino; Nobushige Numa, both of Hiratsuka (JP)

(73) Assignee: Kansai Paint Co., LTD, Amagasaki (JP)

( * ) Notice: Subject to any disclaimer, the term of this patent is extended or adjusted under 35 U.S.C. 154(b) by 0 days.

(21) Appl. No.: 09/146,540

(22) Filed: Sep. 3, 1998

(30) Foreign Application Priority Data

Sep. 3, 1997 (JP) .................................................... 9-237957

(51) Int. Cl.[7] .............................. C08F 8/42; C08F 20/06; C08F 116/12; C09D 5/16
(52) U.S. Cl. ................... 525/327.8; 523/122; 525/328.9; 525/330.2; 525/330.6; 525/372; 525/373
(58) Field of Search ..................... 523/122, 177; 524/558, 556, 560; 525/327.8, 328.4, 330.2, 330.6, 372, 373

(56) References Cited

U.S. PATENT DOCUMENTS

| | | | |
|---|---|---|---|
| 3,979,354 | 9/1976 | Dyckman et al. | 260/37 |
| 4,082,709 | 4/1978 | Dyckman et al. | 260/22 |
| 4,465,795 | * 8/1984 | Sunano et al. | 523/122 |
| 4,499,223 | * 2/1985 | Yamamori et al. | 524/176 |
| 4,594,365 | * 6/1986 | Russell et al. | 523/122 |

FOREIGN PATENT DOCUMENTS

| | | |
|---|---|---|
| 1036749 | 8/1978 | (CA) . |
| 24 58 064 | 8/1975 | (DE) . |
| 0 133 779 | 3/1985 | (EP) . |
| 0 181 037 | 5/1986 | (EP) . |
| 0 698 643 | 2/1996 | (EP) . |
| 0 779 304 | 6/1997 | (EP) . |
| 0 779 304 A1 | 6/1997 | (EP) . |
| 2 167 075 | 5/1986 | (GB) . |
| 96 07677 | 3/1996 | (WO) . |

* cited by examiner

Primary Examiner—David W. Wu
Assistant Examiner—K C Egwim
(74) Attorney, Agent, or Firm—Rader, Fishman & Grauer

(57) ABSTRACT

Antifouling resins and methods for the production of an antifouling resin comprising reacting (i) a base resin (A) simultaneously comprising a carboxyl group and a group having a polyalkylene glycol structure represented by the formula (I)

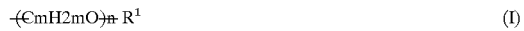

$$-(C_mH_{2m}O)_n-R^1 \qquad (I)$$

wherein $R^1$ is a hydrogen atom or a straight chain, branched, or cyclic alkyl group or an aralkyl group, m is 1, 2, 3, or 4, and n is an integer of not less than 1 and not more than 100 in the molecular unit, with (ii) the oxide or hydroxide of a metallic atom having a valence of not less than 2 in the presence of present water in an amount of 1–30 wt. %, based on the weight of said base resin (A).

13 Claims, No Drawings

METHOD FOR PRODUCTION OF ANTIFOULING RESIN AND ANTIFOULING RESIN COMPOSITION

BACKGROUND OF THE INVENTION

1. Field of the Invention

This invention relates to a method for the production of an antifouling resin and an antifouling coating composition, and more particularly to a method for the production of an antifouling resin. Resins of the present invention are generally suitable for use as binders for antifouling coating materials that are capable of forming a coating film to be used particularly on vessels and marine structures for the prevention of biotic pollution.

2. Description of Related Art

As the binder for an antifouling coating material, resins containing a carboxylate of tin have been widely used heretofore. On account of the toxicity, a switch from this resin to other resin systems has been being strongly urged. In recent years, studies are chiefly directed to resins which contain carboxylates of copper and zinc.

No measure has yet been perfected for controlling the speed of wear of coating films obtained by these resins. Though these resins indeed manifest a fair ability to prevent fouling, they have problems with incurring difficulty in retaining their effects. Further, in the case of a resin which has a metal carboxylate structure in the molecular unit, the method which obtains the resin by simply polymerizing a monomer possessing the metal carboxylate structure entails the problem of incurring difficulty in synthesizing the resin because the polymerization entails the phenomenon of gelation.

SUMMARY OF THE INVENTION

An object to be attained by the present invention resides in developing a resin which allows control of the speed of wear and enables the antifouling property to be manifested for a long time, generally at least one year. It was a further object to develop a method for stable production of the resin. The present inventors have continued a diligent study with a view to attaining these and other objects and have discovered consequently a specific resin which is very easily produced on a commercial scale is highly effective in retaining the antifouling property. This invention has been perfected as a result.

In accordance with these and other objects, there is provided a method for the production of an antifouling resin comprising: reacting a base resin (A) simultaneously containing a carboxyl group and a group having a polyalkylene glycol structure represented by formula (I)

 (I)

wherein $R^1$ is a hydrogen atom or a straight chain, branched, or cyclic alkyl group or an aralkyl group, m is 1, 2, 3, or 4, and n is an integer of not less than 1 and not more than 100 in the molecular unit, with (ii) the oxide or hydroxide of a metallic atom having a valence of not less than 2 in the presence of water present in an amount of 1–30 wt. %, based on the weight of said base resin (A).

The present invention further provides antifouling coating compositions per se as well as antifoaling coating compositions prepared according to the present method.

Other objects, feature and advantages of the present invention will become apparent from the following detailed description. It should be understood, however, that the detailed description and the specific examples, while indicating preferred embodiments of the invention, while indicating preferred embodiments of the invention, are given by way of illustration only, since various changes and modifications within the spirit and scope of the invention will become apparent to those skilled in the art from this detailed description.

DETAILED DESCRIPTION OF A PREFERRED EMBODIMENT

The present invention has developed a resin containing a metal carboxylate structure which allows control of the speed of abrasion and enables the antifouling property to be manifested for a long time and to develop a method for stable production of the resin.

The present invention provides: (1) a method for the production of an antifouling resin characterized by causing a base resin (A) simultaneously containing a carboxyl group and a group of a polyalkylene glycol structure represented by the following general formula (I)

 (I)

(wherein $R^1$ denotes a hydrogen atom or a straight chain, branched, or cyclic alkyl group or aralkyl group, m denotes 1, 2, 3, or 4, and n denotes an integer of not less than 1 and not more than 100) in the molecular unit, to react with the oxide or hydroxide of a metallic atom having a valence of not less than 2 in the presence of water of an amount of 1–30 wt. %, based on the amount of the base resin (A); and (2) an antifouling coating composition characterized by containing as an active component an antifouling resin obtained by reacting a base resin (A) simultaneously containing a carboxyl group and a group of a polyalkylene glycol structure represented by the following general formula (I)

 (I)

(wherein $R^1$ is a hydrogen atom or a straight chain, branched, or cyclic alkyl group or aralkyl group, m is 1, 2, 3, or 4, and n is an integer of not less than 1 and not more than 100) in the molecular unit, with the oxide or hydroxide of a metallic atom having a valence of not less than 2 in the presence of water of an amount of 1–30 wt. %, based on the amount of the base resin (A).

A suitable base resin (A) to be used in the production of the antifouling resin of the present invention is a resin which simultaneously contains a carboxyl group and a polyalkylene glycol structure represented by the aforementioned general formula (I) in the molecular unit thereof. The polyalkylene glycol structure represented by the aforementioned general formula (I) herein has a function of improving the abrasiveness of the coating film without impairing the physical properties thereof. In the aforementioned general formula (I), m is preferred to be 1, 2, 3, or 4 and n, number of repeating units of alkylene glycol, is preferred to be in the range of from not less than 1 to not more than 100. If m exceeds 4 or n exceeds 100, the excess may not be found to produce any discernible improvement in abrasiveness.

Though the base resin (A) mentioned above is available in various kinds including polyester resins, polyurethane resins, and polyamide resins, for example, it is particularly properly such a vinyl polymer that is obtained by copolymerizing a vinyl type monomer containing a carboxyl group, a vinyl type monomer containing a polyalkylene glycol structure, and other vinyl type monomer copolymerizable with these monomers in the presence of a radical polymerization initiator in accordance with the standard method such as a solution polymerization method.

As concrete examples of the vinyl type monomer containing a carboxyl group, (meth)acrylic acid, crotonic acid, itaconic acid, maleic acid, and fumaric acid may be cited.

The vinyl type monomers containing a polyalkylene glycol structure are (meth) acrylic esters containing in the side chain thereof a polyalkylene glycol structure represented by the general formula (1) mentioned above. As concrete examples of the (meth)acrylic ester, methoxyethyl (meth) acrylates, hydroxyethyl (meth) acrylates, methoxypolyethylene glycol (meth) acrylates, nonylphenoxypolyethylene glycol (meth) acrylates, and methoxypolypropylene glycol (meth)acrylates may be cited.

As concrete examples of other monomer copolymerizable with the vinyl type monomer containing a carboxyl group and the vinyl type monomer containing a polyalkylene glycol structure, vinyl aromatic compounds such as styrene, α-methylstyrene, vinyl toluene, and α-chlorostyrene; alkyl esters or cycloalkyl esters of 1–24 carbon atoms of acrylic acid or methacrylic acid such as methyl (meth)acrylate, ethyl (meth)acrylate, n-propyl (meth)acrylate, isopropyl (meth) acrylate, (n-, i-, t-) butyl (meth)acrylate, hexyl (meth) acrylate, cyclohexyl (meth)acrylate, 2-ethylhexyl (meth) acrylate, n-octyl (meth)acrylate, decyl (meth)acrylate, lauryl (meth)acrylate, stearyl (meth)acrylate, and isobornyl (meth) acrylate; perfluoroalkyl (meth)acrylates such as perfluorobutylethyl (meth)acrylate, perfluoroisononylethyl (meth) acrylate, and perfluorooctylethyl (meth) acrylate; fluoroolefins represented by the general formula, $CX_2=CX_2$ (wherein X's invariably or variably denote H, Cl, Br, F, alkyl group, or haloalkyl group, providing the formula contains at least one F) such as $CH_2=CF_2$, $CHF=CF_2$, $CH_2=CF_2$, and $CClF=CF_2$ ;and so-called macromonomers which are polymers of one and/or more such monomers and contain a copolymerizing double bond at one terminal thereof may be cited.

As concrete examples of the solvent to be used in the solution polymerization of the monomer mixture mentioned above, alkylbenzene derivatives such as benzene, toluene, and xylene; acetic ester type solvents such as ethyl acetate, propyl acetate, butyl acetate, amyl acetate, methoxybutyl acetate, methyl aceto-acetate, ethyl acetoacetate, methyl cellosolve acetate, cellosolve acetate, diethylene glycol monomethyl ether acetate, and carbitol acetate; ether type solvents such as dioxane, ethylene glycol diethyl ether, ethylene glycol dibutyl ether, and diethylene glycol diethyl ether; alcohol type solvents such as methanol, ethanol, propanol, i-propanol, and (n-, i-, t-) butanol; and ketone type solvents such as acetone, methylethyl ketone, methylisobutyl ketone, and cyclohexanone may be cited. These solvents may be used either singly or in the form of a mixture of two or more members.

As concrete examples of the radical polymerization initiator, peroxides such as benzoyl peroxide, di-t-butyl hydroperoxide, t-butyl hydroperoxide, cumyl peroxide, cumene hydroperoxide, diisopropyl benzene hydroperoxide, t-butylperoxy benzoate, lauryl peroxide, acetyl peroxide, and t-butyl peroxy-2-ethyl hexanoate; and azo compounds such as α, α'-azobisisobutyro-nitrile, α, α'-azobis-2-methylbutyronitrile, azobisdimethyl valeronitrile, and azobiscyclohexane carbonitrile may be cited.

The acid number of the base resin (A) obtained by the standard method of radical solution polymerization using the vinyl type monomer, solvent, and polymerization initiator mentioned above is generally in the range of 10–300 mg KOH/g, preferably in the range of 20–200 mg KOH/g, and more preferably in the range of 50–150 mg KOH/g. If the acid number is less than 10 mg KOH/g, the coating film will be deficient in abrasiveness and fail to acquire satisfactory antifouling property aimed at. Conversely, if the acid number exceeds 300 mg KOH/g, the produced base resin (A) will acquire too high viscosity to allow easy handling.

The weight average molecular weight of the base resin (A) is generally in the range of 1,000–200,000, preferably in the range of 2,000–100,000, and more preferably in the range of 2,000–50,000. If the weight average molecular weight of the base resin (A) is less than 1,000, the dryness may not be easily obtained as wished and the produced coating film may tend to suffer deficiency in weatherability and durability. Conversely, if the weight average molecular weight exceeds 200,000, the produced coating film may suffer not only degradation of finish appearance but also deficiency in abrasiveness and may no longer afford a satisfactory anti fouling property.

The range for the content of nonvolatiles of the base resin (A) is generally 40 to 80% by weight, preferably 45 to 65% by weight. The range for Gardner viscosity of the base resin (A) is generally A to M, preferably A to G. For the antifouling coating composition, the range for the content of nonvolatiles is generally 30 to 70% by weight, preferably 40 to 60% by weight; the range for Gardner viscosity is generally B to Z2, preferably D to Z.

Further, the alkylene glycol unit in the general formula (I) mentioned above is preferably contained in an amount of not less than 0.005 mol in 100 g of the base resin (A), to maximize its effectiveness in improving the abrasiveness of the coating film.

The antifouling resin of this invention can suitably be obtained by using the base resin (A) satisfying the requirements mentioned above and causing the oxide or hydroxide of a metallic atom having a valence of not less than 2 to react with the base resin (A) in the presence of water of an amount in the range of 1–30 wt. %, based on the amount of the base resin (A) at 50–200° C. for 1–20 hours. While the metal compound in the powdery form is simply dispersed in the base resin (A) during the initial stage of the reaction, the whole mass of the reaction system becomes transparent with the advance of the reaction.

This invention does not discriminate between the oxide or hydroxide of the divalent metallic atom in any respect. From the viewpoints of cost, toxicity, reactivity, etc., the oxide or hydroxide is preferred to be a metal selected from among copper, zinc, calcium, magnesium, and iron.

During this step, the water is effective in not only promoting the reaction but also preventing the reaction system from gelation. Gelation is the phenomenon not to be able to agitate the reaction system because of disappearance of fluidity due to its too high viscosity. If the amount of water is less than about 1 weight %, the added water may not adequately manifest this effect. If the amount exceeds about 30 weight %, the effect will remain the same. The excess water which has survived solution in the system after completion of the reaction can be easily removed by such means as reduction of pressure, decantation, and heating. The molar ratio of the carboxyl group in the base resin (A) to the metal compound, (carboxyl group/metal compound), is preferred to be in the range of 0.1–5.0. If the molar ratio is smaller than about 0.1, the reaction may consume an unduly long time and prove impractical. Conversely, if the molar ratio exceeds about 5.0, the produced resin may not easily manifest lasting abrasiveness because the amount of a free carboxylic acid could be greater than that of the metal carboxylate structure which is an active component.

By the method of this invention, the antifouling resin can be very easily manufactured on a commercial scale. The anitfouling coating composition which contains as the active component thereof the antifouling resin obtained by the method of this invention is high effective in retaining an antifouling property.

Though the mechanism responsible for the antifouling property remains yet to be elucidated in detail, the manifestation of this antifouling property may be logically explained by a supposition that the metal ions in the metal carboxylate structure in the antifouling resin contained as the active component in the antifouling coating composition of this invention are solubilized through ion exchange as with sodium ions in the water, thereby abrading and renewing the surface of the coating film.

consequently obtained was a homogeneous transparent solution having an nonvolatile content of 53%, an acid number of 100 mg KOH/g, and a Gardner viscosity C. The weight average molecular weight of this resin was 6,000.

Production Example 2 and Comparative Production Examples 1–2

Base resin solutions were obtained by following the procedure of Example 1 while changing the mixture of monomer and polymerization initiator and the additional polymerization initiator to those indicated in Table 1. The physical constants of these resin solutions are additionally shown in Table 1.

|  |  |  |  | Production Example | | Comparative Production Example | |
|---|---|---|---|---|---|---|---|
|  |  |  |  | 1 | 2 | 1 | 2 |
| Composition | Monomer | Carboxyl Group Containing Monomer | Acrylic acid |  | 18 |  |  |
|  |  |  | Methacrylic acid | 15 |  |  | 25 |
|  |  | Alkylene Glycerol Structure Containing Monomer | Hydroxyethl methacrylate |  | 15 | 40 |  |
|  |  |  | Methoxyethyl acrylate | 40 |  |  |  |
|  |  |  | Methoxy polyethylene Glycol methacrylate (n = 9) |  | 7 |  |  |
|  |  | Other Monomer | Styrene |  | 10 |  |  |
|  |  |  | Ethyl acrylate | 40 |  | 40 | 30 |
|  |  |  | n-Butyl acrylate |  | 40 |  | 30 |
|  |  |  | Methyl methacrylate | 5 | 10 | 5 | 10 |
|  |  |  | Zinc methacrylate |  |  | 15 |  |
|  | Polymerization initiator | α,α'-Azobis-2-methyl butyronitrile |  | 8 | 6 | 8 | 6 |
|  | Additional Polymerization Initiator | α,α,'-Azobis-2-methyl butyronitrile |  | 1 | 1 | 1 | 0.5 |
| Physical Constants | Nonvolatile content (%) |  |  | 53 | 53 | Gelatin | 53 |
|  | Gardner viscosity |  |  | C | D |  | F |
|  | Weight average molecular weight |  |  | 6,000 | 8,000 |  | 8,000 |
|  | Resin acid number (mg KOH/g) |  |  | 100 | 143 |  | 165 |

EXAMPLES

Now, this invention will be described more specifically below with reference to working examples. Wherever "parts" and "%" are mentioned herein below, they respectively refer to " parts by weight" and "wt. %." The following examples are not meant to limit the invention in any way, but serve merely for purposes of illustration.

Production Example 1

In a reaction vessel provided with a thermometer, a thermostat, a stirrer, a reflux condenser, and a dropping pump, 23 parts of xylene, 30 parts of butyl acetate, and 30 parts of n-butanol were placed and then stirred and heated to 105° C., the resultant mixture was retained at 105° C., and 108 parts of a mixture of monomer and polymerization initiator indicated in Table 1 was added dropwise to the mixture at a fixed speed over a period of 4 hours by the use of the dropping pump. For 30 minutes after the completion of the dropwise addition, the mixture was kept at 105° C. and stirred continuously. Then, a solution of 1 part of an additional polymerization initiator in 6 parts of xylene was added dropwise to the mixture at a fixed speed over a period of 1 hour and the resultant mixture was left standing at 105° C. for 1 hour to complete the reaction. The resin solution Example 1

A transparent resin solution having a Gardner viscosity T was obtained by continuously stirring 200 parts of the base resin solution obtained in Production Example 1 plus 7.5 parts of zinc oxide, 5.3 parts of water, 7.5 parts of butyl acetate, and 7.5 parts of n-butanol at 100° C. for 20 hours.

Examples 2–3 and Comparative Examples 1–3

Invariably transparent resin solutions were obtained by following the procedure of Example 1 while changing the composition of base resin solution, zinc oxide, water, and solvent to those indicated in Table 2. The physical constants of the resin solutions are additionally shown in Table 2.

Incidentally, in Comparative Example 1, absolutely no reaction proceeded as evinced by the observation of a clear sign of sedimentation of zinc oxide after the stirring was stopped.

The resin solutions obtained in Examples 1–3 and Comparative Examples 1–3 were severally applied to an aluminum sheet, 100×300 mm in area, so much as to produce, on drying, a film thickness of 100 μm. The applied layers of the solutions were dried at room temperature and then left immersed at a depth of 1 m in the sea water of Suruga Bay and, after the elapse of 6 months and 12 months, rated for antifouling property in terms of the ratio of surface area affected by biotic pollution (%).

The results are additionally shown in Table 2.

The composition of the present invention give excellent antifouling properties. For example, a preferred ratio of surface area affected by biotic pollution is 0 to 5% after 6 months, and 0 to 10% after 12 months, when the present compositions are used.

Incidentally, in Comparative Example 1 and Comparative Example 2, the coating films were thoroughly solved out and the surfaces of the underlying aluminum sheets became exposed after 6 months immersion.

The priority document Japanese Patent Application No. 9-237957 filed Sep. 3, 1997, is incorporated herein in its entirety be reference, including the specification, abstract tables and claims.

As used herein, articles such as "a" and "the" refer to the singular and/or the form of the object which follows.

5. A method according to claim 1, wherein the molar ratio of said carboxyl group to said metal compound, in said base resin (A) is in the range of 0.1–5.0.

6. A method according to claim 1, wherein said base resin (A) is a polyester resin, a polyurethane resin or a polyamide resin.

7. A method according to claim 1, wherein said base resin (A) is a vinyl polymer that is obtained by copolymerizing a vinyl monomer containing a carboxyl group, a vinyl monomer containing a polyalkylene glycol structure, and optionally additional vinyl monomers in the presence of a radical polymerization.

8. A method according to claim 7, wherein said vinyl monomer containing a carboxyl group is selected from the group consisting of (meth)acrylic acid, crotonic acid, itaconic acid, maleic acid, and fumaric acid.

9. A method according to claim 7, wherein said vinyl monomer containing a polyalkylene glycol structure is

TABLE 2

|  |  |  | Example | | | Comparative Example | | |
|---|---|---|---|---|---|---|---|---|
|  |  |  | 1 | 2 | 3 | 1 | 2 | 3 |
| Composition | Resin Component | Production Example 1 | 200 | 200 |  | 200 | 200 |  |
|  |  | Production Example 2 |  |  | 200 |  |  |  |
|  |  | Comparative Production Example 2 |  |  |  |  |  | 200 |
|  | Metal compound | Zinc oxide | 7.5 |  | 12 | 7.5 |  | 13 |
|  |  | Calcium hydroxide |  | 10 |  |  |  |  |
|  | Water | Deionized water | 5.3 | 6.0 | 5.5 |  |  | 5.5 |
|  | Solvent | Butyl acetate | 7.5 | 7.5 |  | 7.5 |  | 5 |
|  |  | n-Butanol | 7.5 | 7.5 | 10 | 7.5 |  | 5 |
|  |  | Xylene |  |  |  |  |  | 5 |
|  |  | Methyl isobutyl ketone |  |  | 5 |  |  |  |
|  | Nonvolatile content (%) |  | 50.3 | 50.5 | 50.3 | 50.0 | 53.0 | 50.1 |
|  | Appearance |  | Transparent | Transparent | Transparent | Opaque | Transparent | Transparent |
|  | Gardner viscosity |  | T | U | W | A | C | Y |
| Ratio of surface area affected by biotic pollution (%) | After six months |  | 0 | 0 | 0 | 50 | 50 | 0 |
|  | After 12 months |  | 0 | 5 | 3 | 90 | 90 | 30 |

What is claimed is:

1. A method for the production of an antifouling resin comprising reacting (i) a base resin (A) simultaneously comprising a carboxyl group and a group having a polyalkylene glycol structure represented by the formula (I)

$$-(C_mH_{2m}O)_n-R^1 \quad\quad (I)$$

wherein $R^1$ is a hydrogen atom or a straight chain, branched, or cyclic alkyl group or an aralkyl group, m is 1, 2, 3, or 4, and n is an integer of not less than 1 and not more than 100 in the molecular unit, with (ii) the oxide or hydroxide of a metallic atom having a valence of not less than 2 in the presence of water in an amount of 1–30 wt. %, based on the weight of said base resin (A).

2. A method according to claim 1, wherein said metallic atom of a valence of at least 2 is at least one member selected from the group consisting of copper, zinc, calcium, magnesium, and iron.

3. A method according to claim 1, wherein said base resin (A) is a vinyl polymer having an acid number in the range of 10–300 mg KOH/g.

4. A method according to claim 1, wherein said base resin (A) has a weight average molecular weight in the range of 1,000–200,000.

selected from (meth) acrylic esters containing in the side chain thereof a polyalkylene glycol structure represented by the formula (I).

10. A method according to claim 7, wherein said said vinyl monomer containing a polyalkylene glycol structure is selected from the group consisting of (meth)acrylic esters, methoxyethyl (meth)acrylates, hydroxyethyl (meth) acrylates, methoxy-polyethylene glycol (meth) acrylates, nonylphenoxy-polyethylene glycol (meth) acrylates, and methoxy-polypropylene glycol (meth)acrylates.

11. A method according to claim 1, which is conducted at a temperature of 50–200 ° C. for 1–20 hours.

12. A method according to claim 7, wherein said copolymerization involves the use of at least one solvent selected from the group consisting of benzene, toluene, xylene, ethyl acetate, propyl acetate, butyl acetate, amyl acetate, methoxybutyl acetate, methyl aceto-acetate, ethyl acetoacetate, methyl cellosolve acetate, cellosolve acetate, diethylene glycol monomethyl ether acetate, carbitol acetate, dioxane, ethylene glycol diethyl ether, ethylene glycol dibutyl ether, diethylene glycol diethyl ether, methanol, ethanol, propanol, i-propanol, and (n-, i-, t-) butanol, acetone, methylethyl ketone, methylisobutyl ketone, and cyclohexanone.

13. An antifouling coating composition comprising as an active component an antifouling resin obtained by reacting (i) a base resin (A) simultaneously comprising a carboxyl group and a group having a polyalkylene glycol structure represented by formula (I)

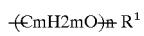 (I)

wherein $R^1$ denotes a hydrogen atom or a straight chain, branched, or cyclic alkyl group or aralkyl group, m denotes 1, 2, 3, or 4, and n denotes an integer of not less than 1 and not more than 100 in the molecular unit, with (ii) the oxide or hydroxide of a metallic atom having a valence of not less than 2 in the presence of water present in an amount of 1–30 weight %, based on the weight of said base resin (A).

* * * * *